Figure 1:
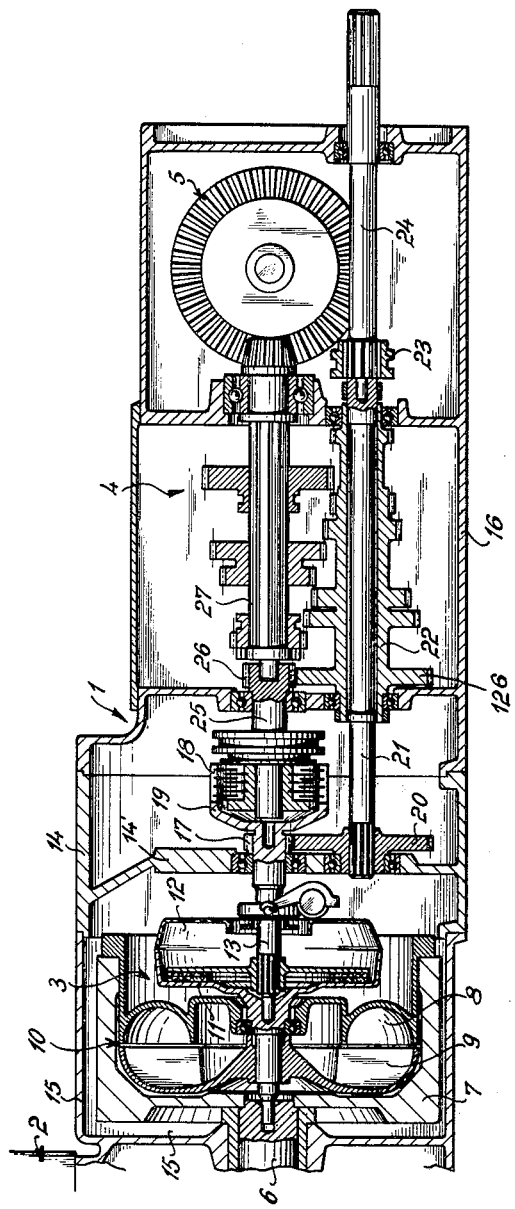

Aug. 21, 1962   F. PORSCHE ETAL   3,049,930
POWER-TRANSMISSION UNIT, ESPECIALLY FOR TRACTORS
Filed March 31, 1958

INVENTORS
FERDINAND PORSCHE
KARL RABE
WALTER EBERLE

BY Dicke and Craig

ATTORNEYS

United States Patent Office 3,049,930
Patented Aug. 21, 1962

3,049,930
POWER-TRANSMISSION UNIT, ESPECIALLY FOR TRACTORS
Ferdinand Porsche, Stuttgart, Karl Rabe, Korntal, Wurttemberg, and Walter Eberle, Goeppingen, Wurttemberg, Germany, assignors to Dr.-Ing. h.c.F. Porsche K.G., Stuttgart-Zuffenhausen, Germany
Filed Mar. 31, 1958, Ser. No. 725,324
Claims priority, application Germany Apr. 11, 1957
2 Claims. (Cl. 74—15.84)

The present invention relates to a vehicle power-transmission unit, especially for tractors, provided with a change-speed transmission adapted to be shifted by means of a clutch, and wherein a fluid coupling is interconnected in the train of power-transmitting elements ahead of the change-speed transmission which includes an independently driven output stub or coupling shaft for purposes of driving other aggregates or auxiliary devices.

Vehicle power-transmitting units are known in the prior art in which the output stub or coupling shaft is independently driven by means of an auxiliary shaft extending through the transmission and through the clutch and operatively connected with the crankshaft.

Furthermore, constructions with double-clutches are known in the prior art in which one clutch disk is coordinated to or operatively connected with the vehicle drive and another clutch disk is coordinated to or operatively connected with the output stub or coupling shaft. The latter drive takes place through the hollow countershaft over a transmission or gear ratio change means formed by meshing gears.

However, all of the aforementioned prior art constructions may be installed, if at all, only with great structural expenditures and space consuming arrangements into a power-transmission unit for a tractor provided with a fluid coupling.

In order to provide an independent output stub or coupling shaft at the tractor, notwithstanding these disadvantages, the drive thereof was derived in other prior art constructions from the control drive of the internal combustion engine such as from the shaft of the fan. Since the output stub or coupling shaft is thereby necessarily disposed at the front end of the tractor, it cannot be used in connection with all operations which may occur and which the tractor would normally be expected to perform.

According to the present invention, an independent coupling or stub shaft drive, which is available at the rear end of the tractor, is realized for power transmitting trains with a fluid coupling in that the output stub or coupling shaft or an auxiliary or countershaft operatively connected therewith is driven by the pump or turbine wheel of the fluid coupling and is led through a hollow shaft of the change-speed transmission to the tractor rear end. Such an arrangement enables under relatively small spatial requirements a very simple transmission construction and distinguishes itself by a high utilitarian efficiency. A construction which is particularly advantageous as regards space is achieved in accordance with the present invention by which a stub shaft or auxiliary shaft extends through a countershaft constructed as hollow shaft and is adapted to be disengaged or unclutched either ahead of or behind the shaft.

A transmission or gear ratio change means is operatively connected in accordance with the present invention in the stub shaft drive between the fluid coupling and the mechanical vehicle clutch. As a result of such a construction, a reduction of the engine rotational speed to a lower stub shaft rotational speed is achieved without complication in the change-speed transmission.

The transmission or gear ratio change means, such as a gear reduction for the auxiliary drive is accommodated in accordance with the present invention together with the vehicle clutch in a space closed off from the change-speed transmission. As a result thereof, the change-speed transmission may be designed and constructed without regard for the requirements of the stub-shaft arrangement.

If separate spaces are coordinated within the tractor to the stub-shaft clutch with the gear ratio change means and to the vehicle clutch connected ahead of the change-speed transmission, then, depending on the individual particular requirements, either a friction-disk clutch operating or immersed in oil or a dry friction-disk clutch may be provided.

The auxiliary gear ratio change means is preferably formed by a hollow shaft connected with the pump wheel or impeller of the fluid coupling which hollow shaft carries the auxiliary or stub-shaft clutch and which drives the stub or coupling shaft directly over a pair of meshing speed-reducing gears.

In particular, a simple solution is obtained for power transmitting trains provided with change-speed means connected, if the auxiliary shaft which is operatively connected with the auxiliary drive or stub shaft extends as a straight or coaxial power train through the hollow drive shaft and through the hollow countershaft of the change-speed transmission, whereby the transmission ratio change means connected with the auxiliary shaft is arranged behind the change-speed transmission.

Accordingly, it is an object of the present invention to provide in a tractor an auxiliary drive for an auxiliary output shaft which is independent of the speed engaged in the change-speed transmission of the tractor including a fluid coupling and which obviates the disadvantages encountered in the prior art constructions.

It is another object of the present invention to provide a power transmitting unit for a tractor having an auxiliary take-off shaft driven independently of the change-speed transmission which is very simple in construction, requires relatively little space and maintains a high versatility of the usefulness of the tractor.

Still another object of the present invention resides in the provision of a power-transmitting unit for a tractor in which the various parts thereof are advantageously accommodated so that either dry clutches or clutches operating in oil may be used, depending on the individual requirements thereof.

These and other objects, features and advantages of the present invention will become more obvious from the following description when taken in connection with the accompanying drawing wherein the FIGURE is an axial longitudinal cross-sectional view of a tractor power-transmission unit provided with an auxiliary stub-shaft drive arrangement in accordance with the present invention.

The term "auxiliary" is used hereinafter and in the claims in connection with those parts and elements used in the power-transmitting unit transmitting torque to the output stub or coupling shaft which forms a separate take-off as contrasted to the parts and elements normally found in the power train transmitting torque to the driven wheels.

Referring now to the drawing reference numeral 1 generally designates the power-transmitting drive unit of a tractor which consists, as is well known, of an internal combustion engine generally designated by reference numeral 2 and not illustrated in detail, of a clutch unit assembly generally designated by reference numeral 3, of a change-speed transmission generally designated by reference numeral 4, and of an axle gear drive unit generally designated by reference numeral 5. The crankshaft 6 of the internal combustion engine 2 carries a fly-wheel 7 which is operatively connected with the pump wheel or impeller 8 for common rotation therewith. The pump wheel or impeller 8 and turbine wheel 9 form part of a fluid coupling generally designated by reference numeral 10. The driving disk 11 of a dry friction disk clutch 12 is connected with the turbine wheel 9 in any suitable manner, for instance, by a splined connection or the like. The driven part of clutch 12 is splined to drive shaft 13 which is rotatably supported, for example, by appropriate bearings, in the partition wall 14' forming part of annular housing portion 14 which is held interchangeably, by means of bolts (not shown) or the like, between clutch housing 15 and transmission housing 16. The drive shaft 13 is formed integral or rigidly connected with a gear wheel 17 and terminates in a bell-shaped part 18 for the support of one set of the friction disks of the vehicle clutch 19.

The gear wheel 17 is in operative engagement with another gear wheel 20 which is mounted on an intermediate auxiliary shaft 21 for common rotation therewith. The intermediate shaft 21 extends through the hollow countershaft 22 of the change-speed transmission 4. In extension of the countershaft 22, the intermediate auxiliary shaft 21 is adapted to be clutched by means of claw clutch 23 to an auxiliary drive shaft 24 consituted by an output stub or coupling shaft. The auxiliary drive shaft 24 is led to the rear end of the tractor below the axle gear drive 5.

The drive of the driven rear wheels (not shown) of the tractor is realized by means of friction disk clutch 19, the transmission input shaft 25, the constant speed reduction 26, 126' with the countershaft 22 and the driven shaft 27.

Operation

During operation of the internal combustion engine 2, the fly-wheel 7 and therewith the pump wheel or impeller 8 of the fluid coupling 10 are rotated. As a result of the circulating fluid in fluid coupling 10, the turbine wheel 9 is operatively connected with the impeller 8 whereby the drive shaft 13 is also rotated provided the clutch 12 is engaged. The engine output or torque is transmitted over the auxiliary transmission-ratio change means constituted by gear reduction formed by the meshing gear set 17, 20 to the intermediate auxiliary shaft 21 and in extension thereof to the auxiliary output shaft 24.

If the clutch 19 is disengaged at the same time, then the tractor stands still whereas the auxiliary output shaft rotates a rational speed proportional to the engine speed and reduced with respect thereto by a factor conditioned on the gear ratio of gear set 17, 20.

If a speed of the change-speed transmission 4 is engaged together with engagement of clutch 19, then the drive of the countershaft takes place over the constant speed-reduction gear set 26 and 126 which in turn drives the transmission output shaft 27 at a ratio determined by that of the engaged speed. Consequently, the tractor is set into motion without, however, affecting the rotational speed of the auxiliary drive or output shaft 24, it being assumed, of course, that the rotational speed of the engine 2 remains the same.

If it becomes desirable during operation to stop the auxiliary output or drive shaft 24 for a short period of time, for example, by reason of the fact that the cutting or harvesting knives have become clogged up, it is only necessary to disengage clutch 12. By disengagement of the latter, the tractor also comes to a standstill automatically so that no cutting or harvesting losses occur.

It is understood that the present invention is not limited thereto but is susceptible of many changes and modifications within its spirit and scope. For example, instead of the two-element fluid coupling a torque converter or any other type of fluid coupling may be used. Similarly, any known type of change-speed transmission including planetary gears may be used. The clutches may also be of any known type and construction. It is, therefore, understood that the specific embodiment is shown and described herein only for illustrative purposes, and it is intended to cover all such changes and modifications of the present invention as encompassed by the appended claims.

We claim:
1. A power transmitting unit, especially for a tractor, comprising change-speed transmission means having a hollow countershaft and operative to provide a plurality of different speeds, a drive clutch means operatively connected with said change-speed transmission means to enable the selective engagement of the drive through said change-speed transmission in the various speeds thereof, a power take-off shaft extending from the rear of said tractor adapted to drive agricultural implements, means for driving said power take-off shaft comprising an auxiliary shaft within said hollow countershaft and rotatable relative thereto, clutch means for selectively connecting said power take-off shaft and said auxiliary shaft comprising a slidable clutch member on said power take-off shaft and cooperating clutch teeth on one end of said auxiliary shaft, a gear secured to the other end of said auxiliary shaft, a drive shaft, a gear integral with said drive shaft meshing with said rotatable gear, said means for driving said power take-off shaft further comprising fluid coupling means comprising input means and output means, said output means being operatively connected with said drive shaft, and a rigid connection between said drive shaft and said drive clutch means.

2. A power-transmitting unit, especially for tractors, according to claim 1, wherein said unit includes separate compartments for accommodating therein said power take-off shaft, said hollow countershaft, said first and second-mentioned gears and said fluid coupling means, respectively.

References Cited in the file of this patent

UNITED STATES PATENTS

| | | |
|---|---|---|
| 2,506,671 | Jacobi | May 9, 1950 |
| 2,531,818 | Kranick | Nov. 28, 1950 |
| 2,603,322 | Dunn | July 15, 1952 |
| 2,613,774 | Neracher et al. | Oct. 14, 1952 |
| 2,613,775 | Dunn | Oct. 14, 1952 |
| 2,618,979 | Benning | Nov. 25, 1952 |
| 2,699,689 | Ahlen | Jan. 18, 1955 |
| 2,723,569 | Ferguson et al. | Nov. 15, 1955 |
| 2,743,789 | Ferguson et al. | May 1, 1956 |
| 2,747,416 | Swenson et al. | May 29, 1956 |
| 2,776,572 | Walter | Jan. 8, 1957 |
| 2,839,951 | Winther | June 24, 1958 |
| 2,891,640 | Binder | June 23, 1959 |
| 2,935,899 | Nallinger | May 10, 1960 |
| 2,953,038 | Richards | Sept. 20, 1960 |
| 2,970,482 | Strehlow et al. | Feb. 7, 1961 |

FOREIGN PATENTS

| | | |
|---|---|---|
| 505,413 | Belgium | Sept. 15, 1951 |